(12) United States Patent
Richt et al.

(10) Patent No.: US 8,967,924 B2
(45) Date of Patent: Mar. 3, 2015

(54) CORE DRILLING MACHINE HAVING AN INTERCHANGEABLE DRILL BIT

(75) Inventors: Boris Richt, Hemmingen (DE); Christian Stark, Rottenburg-Hemmendorf (DE); Nicasio Garifo, Metzingen (DE)

(73) Assignee: C. & E. Fein GmbH (DE)

( * ) Notice: Subject to any disclaimer, the term of this patent is extended or adjusted under 35 U.S.C. 154(b) by 544 days.

(21) Appl. No.: 13/410,643

(22) Filed: Mar. 2, 2012

(65) Prior Publication Data

US 2012/0163933 A1 Jun. 28, 2012

Related U.S. Application Data

(63) Continuation of application No. PCT/EP2010/062542, filed on Aug. 27, 2010.

(30) Foreign Application Priority Data

Sep. 2, 2009 (DE) .......................... 10 2009 040 513

(51) Int. Cl.
  *B23B 51/05* (2006.01)
  *B23B 51/04* (2006.01)
(52) U.S. Cl.
  CPC ......... *B23B 51/0426* (2013.01); *B23B 51/0453* (2013.01); *B23B 51/0473* (2013.01); *B23B 2260/136* (2013.01)
  USPC ............................... 408/204; 408/68; 408/206
(58) Field of Classification Search
  USPC ........... 408/68, 127, 141, 204, 206, 117–119, 408/132, 134
  IPC ............................................. B23B 51/04,51/05
  See application file for complete search history.

(56) References Cited

U.S. PATENT DOCUMENTS 1,705,049 A * 3/1929 Fournier ..................... 408/68
3,825,362 A  7/1974 Hougen
(Continued)

FOREIGN PATENT DOCUMENTS

DE  2409017 A1  9/1974
DE  3807225 A1  9/1989
(Continued)

OTHER PUBLICATIONS

International Preliminary Report on Patentability and Translation of the Written Opinion of the International Searching Authority; Application No. PCT/EP2010/062542; Issued: Mar. 27, 2012; 10 pages.
(Continued)

*Primary Examiner* — Daniel Howell
(74) *Attorney, Agent, or Firm* — St. Onge Steward Johnston & Reens LLC (57) ABSTRACT

A core drilling machine having an axial extending hollow drill shaft supported rotatably in a housing and rotated by means of a drive unit; a coaxial tool holder receiving an axially displaceable drill bit, the tool holder having a locking mechanism securing the drill bit in a rotationally fixed manner to the hollow drill shaft; wherein the hollow drill shaft is suitable for receiving a shaft of an interchangeable centre drill, the center drill axially supported against a first spring element; and an axial stop element preventing in a first position a complete displacement of the center drill into the interior of the hollow drill shaft and allows in a second position a complete displacement of the center drill into the interior of the hollow drill shaft; and an activation device for activating the first or second positions of the stop element.

15 Claims, 8 Drawing Sheets

(56) References Cited

U.S. PATENT DOCUMENTS

| | | | | |
|---|---|---|---|---|
| 4,204,783 A | * | 5/1980 | Hougen | 408/68 |
| 4,385,853 A | * | 5/1983 | Strange et al. | 408/68 |
| 4,555,203 A | * | 11/1985 | Takahashi | 408/119 |
| 4,624,608 A | * | 11/1986 | Shiomi et al. | 408/56 |
| 5,062,748 A | * | 11/1991 | Kishida | 408/206 |
| 5,427,482 A | * | 6/1995 | Asano et al. | 408/240 |
| 2009/0044674 A1 | | 2/2009 | Neitzell | |

FOREIGN PATENT DOCUMENTS

| | | | |
|---|---|---|---|
| DE | 4141045 A1 | | 6/1993 |
| DE | 19717037 C1 | | 10/1998 |
| EP | 0873831 B1 | | 8/2000 |
| JP | 57102712 A | * | 6/1982 |
| JP | 57201114 A | * | 12/1982 |
| JP | 58010416 A | | 1/1983 |
| JP | 8336713 A | | 12/1996 |

OTHER PUBLICATIONS

International Search Report & Written Opinion of the International Searching Authority; Application No. PCT/EP2010/062542; Issued: Nov. 23, 2010; Mailing Date: Nov. 30, 2010; 10 pages.

* cited by examiner

CORE DRILLING MACHINE HAVING AN INTERCHANGEABLE DRILL BIT

This is a continuation application of the co-pending international application PCT/EP2010/062542 (WO 2011/026787 A1) filed on Aug. 27, 2010, which claims priority of the German patent application DE 10 2009 040 513.5 filed on Sep. 2, 2009, which are fully incorporated herewith by reference.

BACKGROUND OF THE INVENTION

The present invention relates to a core drilling machine as well as a drill bit and a centre drill which are suitable for being inserted into the core drilling machine.

RELATED PRIOR ART

Core drilling is generally known. Core drilling has the advantage that only an annular gap needs to be cut, but not the entire drill cross section.

Different manufacturers offer conventional core drilling machines which are suitable for rocks and which can be guided manually or mounted to specific tripods (drill stands).

Core drilling is also used for drilling metallic materials. In this case, however, only core drilling machines are known which are mounted in drill stands, which in turn are secured to a work piece, which is to be worked, by means of a magnetic force or subpressure. For this purpose, drill bits are used which comprise, for example, a centre pin sharpened in the front for positioning the core drilling machine on the work piece.

In the prior art either centre pins or centre drills are used for centring the drill bit. Centre pins or centre drills can be used for dispensing drill cores simultaneously.

Mounting the drill bits in conventional mandrels is obtained by numerous different solutions known in the prior art.

Contrary to drilling with a drill stand, a drill hole can "drift" or "move" in one direction if the drill process is performed manually. Centre pins, as used during stand-guided drill operations, can not prevent this reliably during a manually performed drilling process. Thus, during hand-guided core drill processes centre drills need to be used. In this context, it is disadvantageous that known centre drills perforate the entire work piece. It would be advantageous to allow the centre drill penetrating that deep into the work piece until it is certainly ensured that the drill cannot "drift".

Further, centre drills are known in the prior art, which can be moved manually to extended or retracted positions. In this manner, drilling happens in two steps. In a first step, a pilot hole is drilled with the centre drill. Then, the centre drill is engaged manually, or a rotational take up is deactivated. In a second step, drilling of the core hole is completed. This method is time-consuming and provokes misoperations since lazy users perform the entire drilling process with an activated centre drill in order to avoid an interruption of the drilling process.

The European patent EP 0 873 831 B1 discloses a core drilling machine, wherein a pilot hole drilled by a centre drill without interrupting the drilling process at first, then the centre drill is unlocked from a positive lock, which drives the centre drill, so that only the drill bit is still rotated. In this context, unlocking happens automatically while a certain surface pressure is overcome, wherein the surface pressure needs to be exerted manually on the drill. As soon as the operator recognizes that the pilot hole is formed, the operator increases the surface pressure, thereby switching the centre drill effective.

This drilling machine is dangerous in that the operator increases the surface pressure too early, thereby deactivating the centre drill prematurely. In this case, the pilot hole is not yet sufficiently deep for preventing the "drift".

The document DE 38 07 225 A1 discloses a drilling-tool holder. The document JP 08-336713 A discloses a core drilling machine.

SUMMARY OF THE INVENTION

In view of these facts it is an object of the invention to provide a machine for core drilling, preferably metallic materials, the machine ensuring good centring of the, preferably manually guided, drilling process without cutting too much material. In particular, the drilling process should be performable without potential misoperations, i.e. the operator is not supposed to interrupt the drilling process due to a manual intervention, or to be forced to increase the surface pressure shortly. Preferably, the core drilling machine should be available for the next drilling operation immediately and automatically after completion of the drill without any manual intervention.

This object is solved by a core drilling machine comprising the following components: an axially extending hollow drill shaft which is rotationally supported in a housing of the core drilling machine and which can be rotated by means of a drive unit; a coaxial tool holder for receiving a drill bit which can be mounted in an axially displaceable manner, wherein the tool holder comprises a locking mechanism securing the drill bit in a rotationally fixed manner to the hollow drill shaft, and allows a limited axial displacement of the drill bit relative to the hollow drill shaft; wherein the hollow drill shaft is suitable for receiving a shaft of an interchangeable centre drill in the front interior thereof, preferably in a positively engaged manner, wherein the centre drill can be coupled in a rotationally fixed manner to the hollow drill shaft, wherein the centre drill can move axially in a limitable manner in the hollow drill shaft and can be supported axially against a first spring element; and an axial stop element for the centre drill which prevents, in a first position, complete displacement of the centre drill into the interior of the hollow drill shaft, and allows, in a second position, complete displacement of the centre drill into the interior of the hollow drill shaft; and an activation device for activating the first and second positions of the stop element in dependence on an axial position of the drill bit relative to the hollow drill shaft.

In an assembled state, both the centre drill and drill bit are supported axially displaceable relative to the drill shaft. During a first drilling phase the centre drill abuts against a stop element which prevents the centre drill from dipping deeply into the interior of the hollow drill shaft for the time being. In this manner, at least a first part of the pilot hole can be drilled.

If the forward movement of the entire drilling machine is continuously continued, then the drill bit abuts against the workpiece, which is to be worked, and consequently is pushed rearward, thereby triggering a mechanism releasing the stop element, which has prevented the centre drill from a deeper dip. As soon as the path of the centre drill is free, the centre drill can avoid the forward movement of the drilling machine so that only the drilling machine is inserted deeper into the workpiece to be worked.

As soon as the drill bit has penetrated the workpiece, the drill core is loose and squeezed out of the drill bit by means of the centre drill, which is axially biased in the interior of the core drilling machine by means of a spring. Both the centre drill and drill bit, which in turn are axially supported relative to another spring, are returned to their starting positions by means of the spring forces. Then, the core drilling machine is ready for the next drilling process without the need to interrupt the previous drilling process, wherein the centre drill cannot "drift" and the different components are not subjected to wear being too high.

Both the rotational following and axial displacement of the drill bit is possible, for example, due to a groove in the drill bit extending in the axial direction. For this purpose, the tool holder of the drilling machine comprises a correspondingly adapted locking mechanism. It is clear that the drill bit can also comprise a projection projecting radially to the outside, the projection corresponding to a corresponding recess in the tool holder having an adapted locking mechanism.

Further, it is preferred to have the stop element in the second position while the drill bit is in an axially closest position relative to the hollow drill shaft.

In this position the drill bit abuts, in particular, against the tool holder.

With a preferred embodiment a radially displaceable stop element is supported in the hollow drill shaft within an area where the sliding sleeve sits radially on the outside of the hollow drill shaft so that the stop element, in a relaxed state of the second spring element, is forced into the interior of the hollow drill shaft by means of the sliding sleeve such that the stop element projects from the interior, and so that the stop element, in a compressed state of the second spring element, can be moved radially to the outside such that the centre bore can penetrate axially deeper into the back of the hollow drill shaft behind the stop element.

Additionally, it is advantageous if an inner cavity of the sliding sleeve comprises an increasing radius when an axial length increases towards the front, thereby providing to the stop element space in a radial direction in order to avoid the centre bore which can move axially.

Hence, the sliding sleeve is specifically formed with regard to an inner contour thereof. The contour is selected such that the sliding sleeve allows the stop element projecting towards the interior of the hollow drill shaft in the normal position of the sliding sleeve, if the spring element assigned thereto is not compressed. If the drilling process has sufficiently advanced, as described above, the sliding sleeve is pushed axially towards the back. Space is generated by the contour, which is required by the stop element in order to allow retraction from the interior of the hollow drill shaft. Then, the way of the centre drill is free for allowing the centre drill to retract into the hollow drill shaft that far as the core drilling machine is moved forwardly during the actual drilling process by means of the drill bit. Thus, the depth of the pilot hole is not changed. Nevertheless good guidance and centralization is ensured at any time.

Preferably, each connecting element is a pin which is supported axially displaceable within the hollow drill shaft and which is arranged between the sliding sleeve and the inserted drill bit for coupling the drill bit and the sliding sleeve directly, or indirectly by means of one or more disks, for the purpose of an axial displacement of the sliding sleeve towards the back.

With another special embodiment the tool holder comprises a front part of the hollow drill shaft, where the locking mechanism is arranged, and an axially displaceable tension sleeve supported against a third spring element, the tension sleeve being supported radially, in a relaxed state of the third spring element, against the front part of the hollow drill shaft in an area of the locking mechanism.

The locking mechanism serves for securely receipt and release of the drill bit as well as radial guidance and takes up.

Further, it is advantageous if the locking mechanism comprises at least one latch element, wherein each of the latch elements sits in a radial channel within the front part of the hollow drill shaft, the length of the channel being selected such that the latch element protrudes radially from the supporting tension sleeve towards the interior of the hollow drill shaft in a relaxed state of the third spring element. Then, the latch element engages in the groove of the inserted drill bit so that the drill bit cannot be extracted axially from the tool holder.

With another embodiment the first spring element is arranged between a rear end of the interior of the hollow drill shaft and the inserted centre drill.

Thereby it is ensured that the first spring element ejects the drill core by means of the centre drill as soon as the drilling process is completed, i.e. as soon as the drill bit has penetrated the workpiece, which is to be worked.

Thereby, also the return operation of the different moveable components of the core drilling machine is initiated.

With another advantageous embodiment of the core drilling machine the second spring element is arranged coaxially on the hollow drill shaft between the sliding sleeve and a locking element, which is supported in a rotationally fixed and axially non-displaceable manner on the outside of the hollow drill shaft.

The second spring element serves for automatically returning the displaceably supported sliding sleeve to the starting position thereof as soon as the drilling process is completed.

With another preferred embodiment the centre drill protrudes the tool holder at the front and the drill bit axially, in the inserted state thereof, if all of the spring elements are in a relaxed state.

Thus, it is ensured that with a manually guided operation the centre drill can be used as positioning assistance in order to position the core drilling machine relative to the workpiece, which is to be worked.

Even further, the above-mentioned object is solved by a drill bit for insertion into a core drilling machine of the present invention, wherein the drill bit comprises at least one groove into which the locking mechanism, in the inserted state of the drill bit, engages so that the drill bit rotates synchronously if the hollow drill shaft is rotated, and so that the drill bit is supported simultaneously in an axially displaceable manner relative to the tool holder.

Preferably, an axial length of the groove is (at least) selected sufficiently long so that the drill bit, during a drilling process, axially pushes the sliding sleeve by means of the at least one connecting element to the back, thereby compressing the second spring element such that the sliding sleeve provides to the stop element sufficient space in a radial direction in order to avoid the axially displaceable centre drill.

Additionally, it is advantageous if the drill bit comprises a receiving sleeve, an apron and a cutting cup, wherein the groove is formed in the receiving sleeve, wherein the apron projects radially relative to the receiving sleeve, and wherein a length of the receiving sleeve is selected so that the apron abuts against a front edge of the tool holder, in order to transmit an advance force completely from the core drilling machine to the drill bit.

The apron, which projects radially from the receiving sleeve, serves as a security stop limiting the displacement path of the drill bit, and thus also limiting the displacement path of the sliding sleeve. Damages within the core drilling machine are excluded, which might happen if the axially displaceable elements, in particular the sliding sleeve, move too far to the back, i.e. into the interior of the core drilling machine.

BRIEF DESCRIPTION OF THE DRAWINGS

It is clear that the above-mentioned and hereinafter still to be explained features cannot be used only in the respectively given combination but also in other combinations or alone, without departing from the scope of the present invention.

Embodiments of the invention are illustrated in the drawings and will be explained in more detail in the following description, wherein.

PREFERRED EMBODIMENTS OF THE INVENTION

Figure 1:
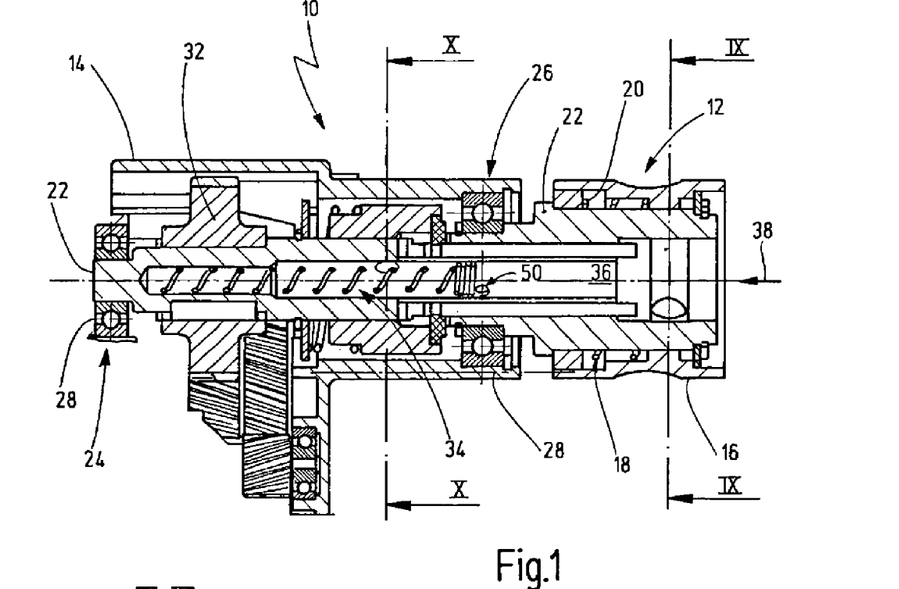
FIG. 1 shows an isolated sectional side view of a core drilling machine of the present invention without drill bit and centre drill.

In the following both arrangement and functionality of a core drilling machine according to the present invention will be explained. Each of the FIGS. 1 through 10 shows the same core drilling machine 10. FIG. 1 shows a sectional side view through the isolated core drilling machine 10 being provided without drill bit and centre drill. FIGS. 2 through 8 show sectional side views of the core drilling machine 10 including a drill bit and a centre drill in different sequences showing characteristic sections of a drilling process. FIGS. 9 and 10 show sectional views of specific axial sections of the overall system of the invention, in particular as far as an axial displacement of certain components is concerned.

In FIG. 1 the core drilling machine 10 is shown in combination with a tool holder 12 and a housing 14, but without a drill bit and a centre drill. The core drilling machine 10 is not shown completely since the remaining components such as rotational drives, controlling electronics, etc. are not important to the present invention.

The tool holder 12 comprises tension sleeve 16 supported axially, by means of a spring element 18, in this case spiral spring 20, against a front part of a hollow drill shaft 22 in a spring-loaded manner. The hollow drill shaft 22 is supported against the housing 14 in a rotational manner by means of a first bearing 24 and a second bearing 26. In this case, the bearings 24 and 26 are implemented in terms of roller bearings 28. The hollow drill shaft 22 extends substantially in an axial direction along a longitudinal axis 30 thereof. The hollow drill shaft 22 is rotated by means of a drive wheel 32 being secured by a spring key.

An additional spring element 34, in this case also in terms of a spiral spring 48, is arranged axially in an interior 36 of the hollow drill shaft 22 and held within the hollow drill shaft 22 by means of a locking element (see recess 50 for receiving, for example, radially protruding locking pins). The additional spring element 34 can already be biased. If the additional spring element 34 is biased, the drill core can be ejected by a greater force.

A drill bit is introduced into the front of the tool holder 12, as indicated by means of an arrow 38 in FIG. 1.

Figure 2:
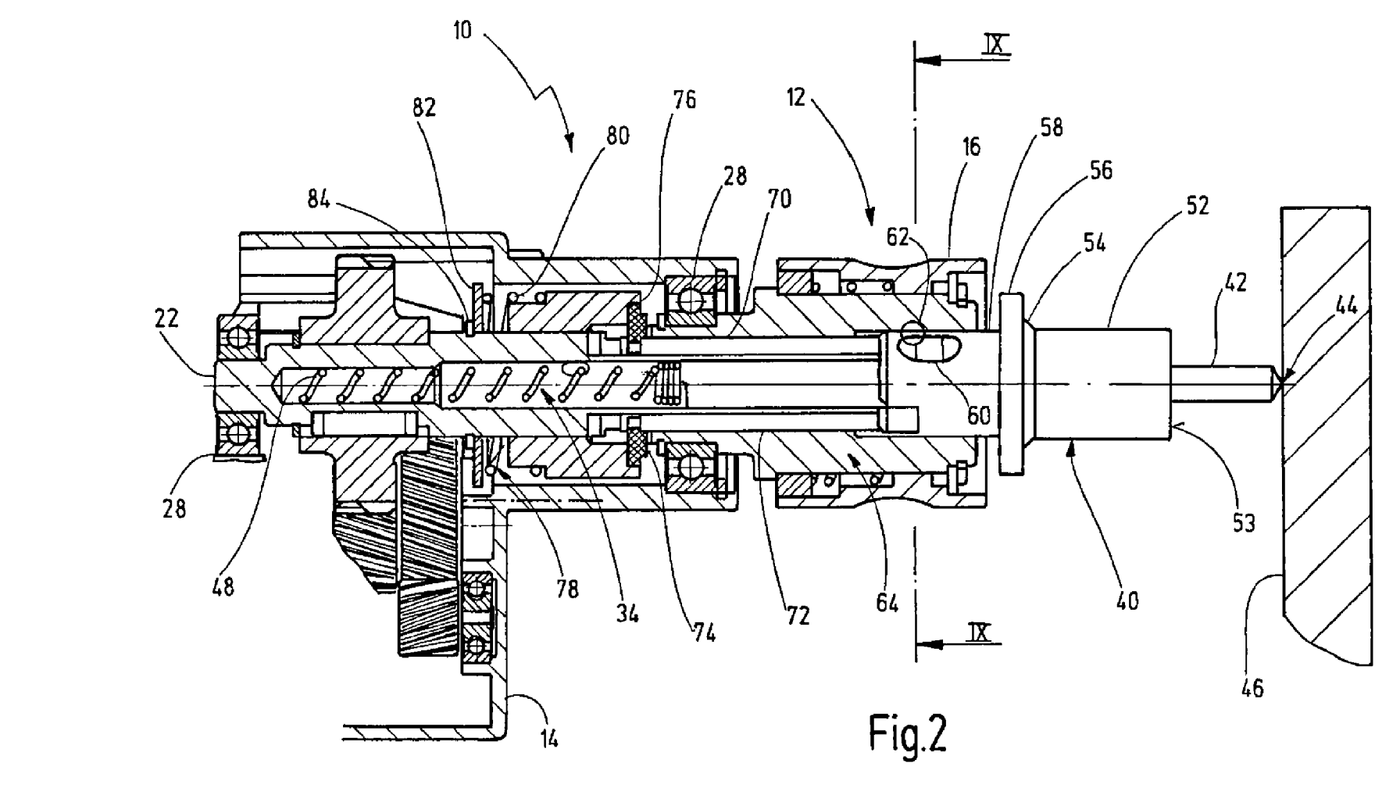
FIG. 2 shows a sectional side view of the core drilling machine of FIG. 1 having a drill bit and a centre drill in a starting position.

FIG. 2 shows the core drilling machine 10 of FIG. 1 having an axially inserted drill bit 40 as well as a centre drill 42, which has already been introduced axially. FIG. 2 depicts a situation where a tracing point 44 on a workpiece 46, which is to be worked, is aimed at by means of the centre drill 42. This can be done by the operator without any problem since the sight on the tracing point 44 is free.

In an axial direction the drill bit 40 comprises a cutting cup 52 having a front cutting edge 53, a tapered section 54 radially widening, an apron 56 serving as a stop, as well as a receiving sleeve 58. The receiving sleeve 58 in turn comprises a groove 60 extending substantially in the longitudinal direction 30, which is suitable for receiving a latch element 62 (e.g. a ball) of a locking mechanism 61, which presently is not illustrated in more detail. The ball 62 limits an axial displacement of the drill bit 40. Further, the (protruding) ball ensures that the drill bit 40 rotates synchronically together with the hollow drill shaft 22, if the drill shaft 22 is rotated. Here, the ball 62 is arranged in a radial channel, being not depicted in more detail here, in the front part 64 of the hollow drill shaft.

For releasing the drill bit 40 from the tool holder 12 the tension sleeve 16 is moved axially rearward against the spring 20 so that the tension sleeve 16 does no longer prevent the ball 62 from moving radially to the back in an outwardly orientated direction, thereby allowing retraction of the drill bit 40.

The front part 64 of the hollow drill shaft 22 further comprises axial passages in an axial direction which serve for receiving at least one connecting element. In the present example two pins 70 and 72 extending axially are provided as the connecting elements, in order to allow displacement of a sliding sleeve 76 axially rearward if the drill bit 40 is pushed axially to the back. Thus, the pin 70 and 72 provide an effective connection between the drill bit 40 and the sliding sleeve 76. The pins 70 and 72 form an activation device together with the sliding sleeve 70, the activation device can be moved to first and second positions.

The sliding sleeve 76 sits in an axially displaceable and supported manner on the outer shell of a rear part of the hollow drill shaft 22. Axial displacement of the sliding sleeve 76 happens against another spring element 78, which in this case is also implemented in terms of a spiral spring 80. The spiral spring 80 abuts against a disk 82, which in this case is prevented from an axial movement to the back by means of a locking ring 84. The locking ring 84 is arranged in a rotationally fixed manner relative to the hollow drill shaft 22. Normally, the sliding sleeve 76, the spiral spring 80 and the disks 74 and 82 rotate synchronously together with the hollow drill shaft 22, even if an axial displacement of the sliding sleeve 76 occurs.

The hollow drill shaft 22 is preferably formed integrally, wherein the interior 36 is formed such that the centre drill 42 rotates with the hollow drill shaft 22 either by means of frictional engagement or positive engagement, if the hollow drill shaft 22 is driven, i.e. is rotated.

Figure 3:
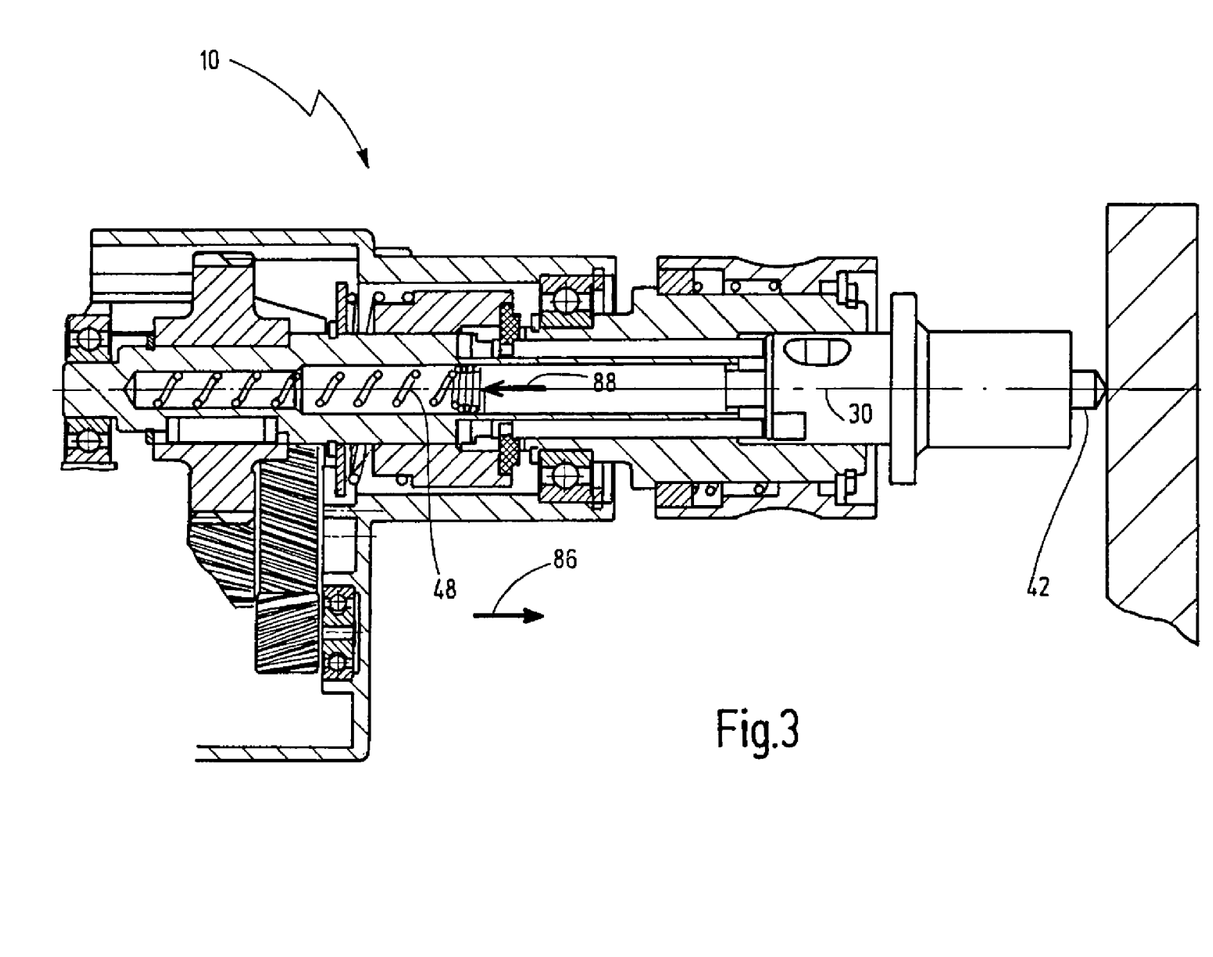
FIG. 3 shows the core drilling machine of FIG. 2 after being positioned on a work piece which is to be worked.

As soon as the core drilling machine 10 is positioned correctly, as shown in FIG. 2, the core drilling machine 10 can be switched on and guided forward by an operator, as indicated in FIG. 3 by means of an arrow 86. In this context, typically the rotation of the hollow drill shaft 22 is already activated. The centre drill 42 moves axially to the back within the interior 36 due to the forward movement 86 of the core drilling machine 10. In this case, the centre drill 42 moves against the spring 48. The centre drill 42 can be moved so far to the back until it abuts against a stop element, as will be explained in more detail below. The movement of the centre drill 42 relative to the core drilling machine 10 is indicated by means of an arrow 88.

Figure 4:
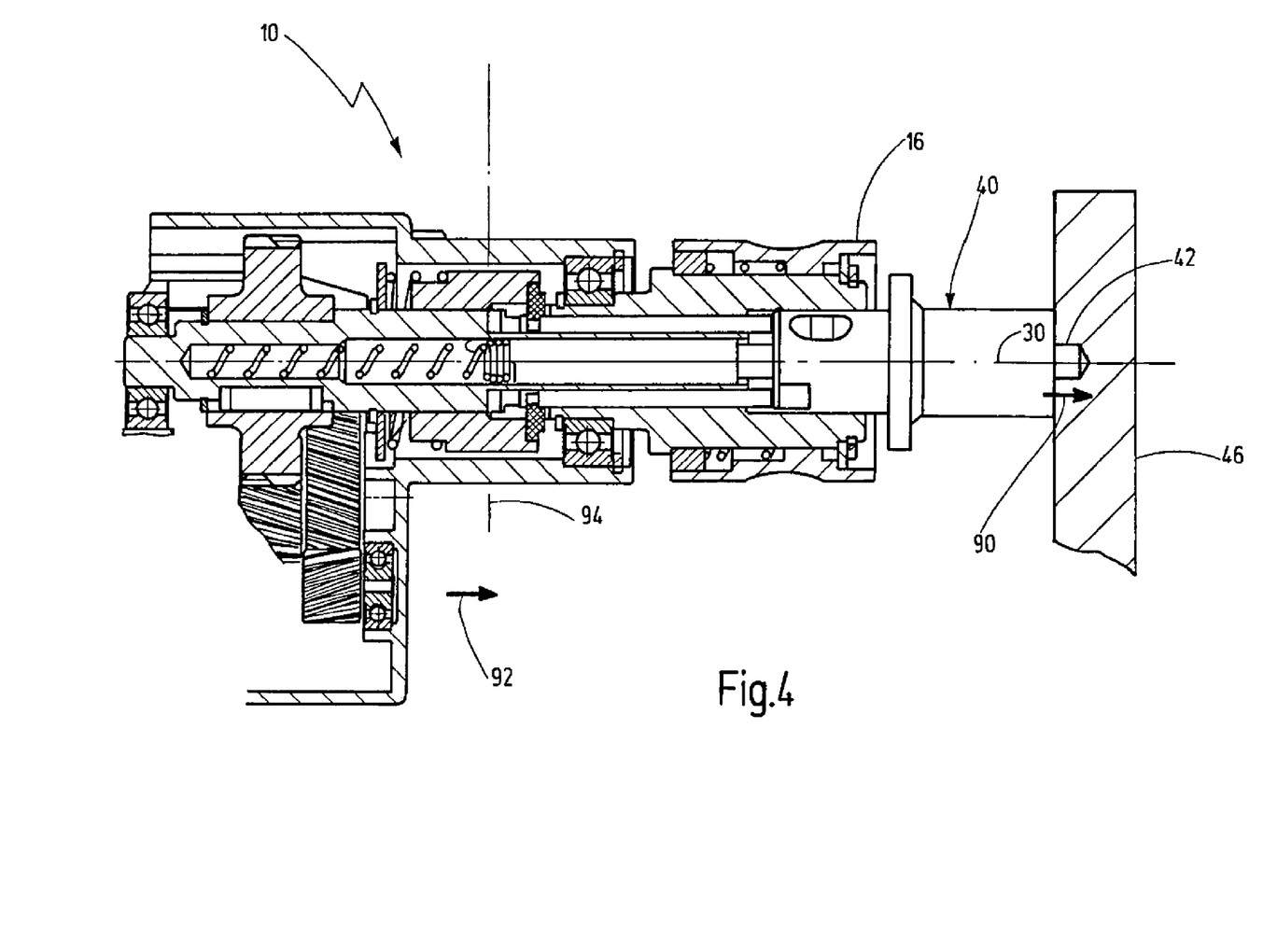
FIG. 4 shows the core drilling machine of FIG. 3 after a pilot hole is pre-drilled.

With reference to FIG. 4 a situation is shown in which the core drilling machine 10 has been moved a little further to the front in comparison to FIG. 3, as indicated by means of the arrows 90 and 92 in FIG. 4. In this context, the front tip of the centre drill 42 penetrates with a first depth into the workpiece 46 and forms a pilot hole. The drill bit 40 does not move relative to the tool holder 12 and the front part 64 of the hollow drill shaft 22.

In this case, the centre drill 42, as already mentioned above, is supported against a stop element arranged close to an auxiliary line 94. The auxiliary line 94 shows a front edge of an opening which can be penetrated by the stop elements that are still to be described below.

With reference to FIG. 10 two balls 110 are shown as the stop elements, which are supported in radial channels, not being designated in more detail, substantially within the hollow drill shaft 22 so that the balls 110 protrude radially towards the interior 36 (see also FIG. 1). The balls 110 prevent the centre drill 42 from retracting further backwards into the hollow drill shaft 22. This situation (first position) is shown in FIG. 4.

Figure 5:
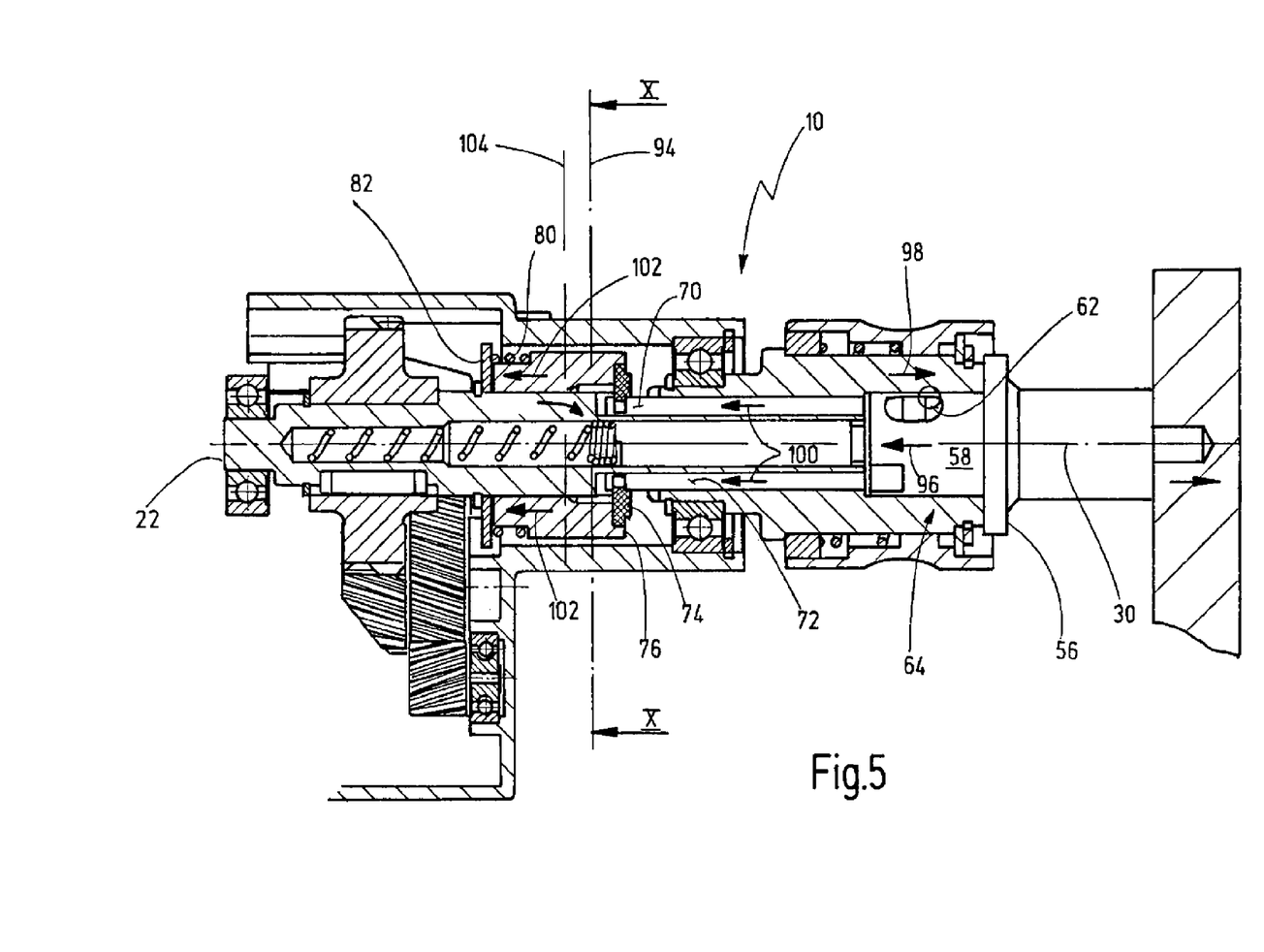
FIG. 5 shows the core drilling machine of FIG. 4 after the pilot hole has been extended.

If the operator continuous to exert forward pressure, thus this surface force acts on the drill bit 40 which retracts further backwards relative to the tool holder 12 in the direction of an arrow 96, as shown in FIG. 5. In this context, the centre drill 42 further penetrates into the workpiece 46 and enlarges the deepening of the pilot hole. The pilot hole gets deeper about the path travelled by the apron 56 towards the front part 64 of the hollow drill shaft 22, until the apron 56 abuts against the front part 64. Hence, the front part 64 approaches, from a relative point of view, the drill bit 40, as indicated in FIG. 5 by means of an arrow 98.

The drill bit 40 abuts against the pins 70 and 72 and pushes same, since the pins 70 and 72 are supported axially in a displaceable manner, rearward within the hollow drill shaft 22. This displacement towards the back is transmitted by means of the disk 74 to the gliding sleeve 76 which in turn moves axially towards the back as well. Thereby, the spring 80 is compressed. The specific inner contour of the sliding sleeve 76 releases the path for the stop elements (balls 110, see FIG. 10). Therefore, the stop elements can move radially to the outside. This is indicated in FIG. 5 by means of an arrow 106 where emerging openings for the balls 110 in the hollow drill shaft 22 can be recognized.

The axial displacement of the sliding sleeve 76 to the back is indicated by means of an arrow 102. The axial displacement also becomes clear when looking at the additional auxiliary line 104 depicting the displacement of the radially closer inner part relative to the position of FIG. 4 (see auxiliary line 94). Since the balls 110 can now be moved radially to the outside, the centre drill 42 can be pushed back deeper into the interior 36 of the hollow drill shaft 22 (second position), if the core drilling machine 10 continues to move forward.

Figure 6:
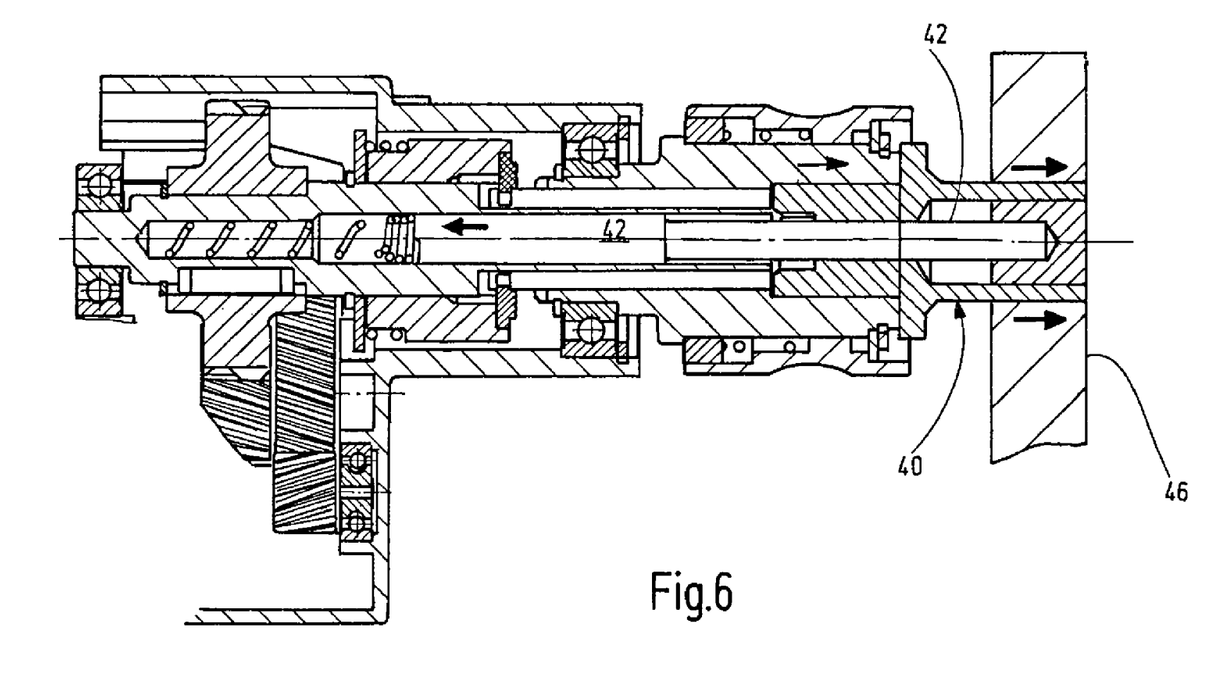
FIG. 6 shows the core drilling machine of FIG. 5 after the drill bit has penetrated the workpiece which is to be worked.

This is shown in FIG. 6 (second position). The centre drill 42 substantially remains stationary relative to the to-be-worked workpiece 46. The drill bit 40 enters the workpiece 46 and penetrates same.

Figure 7:
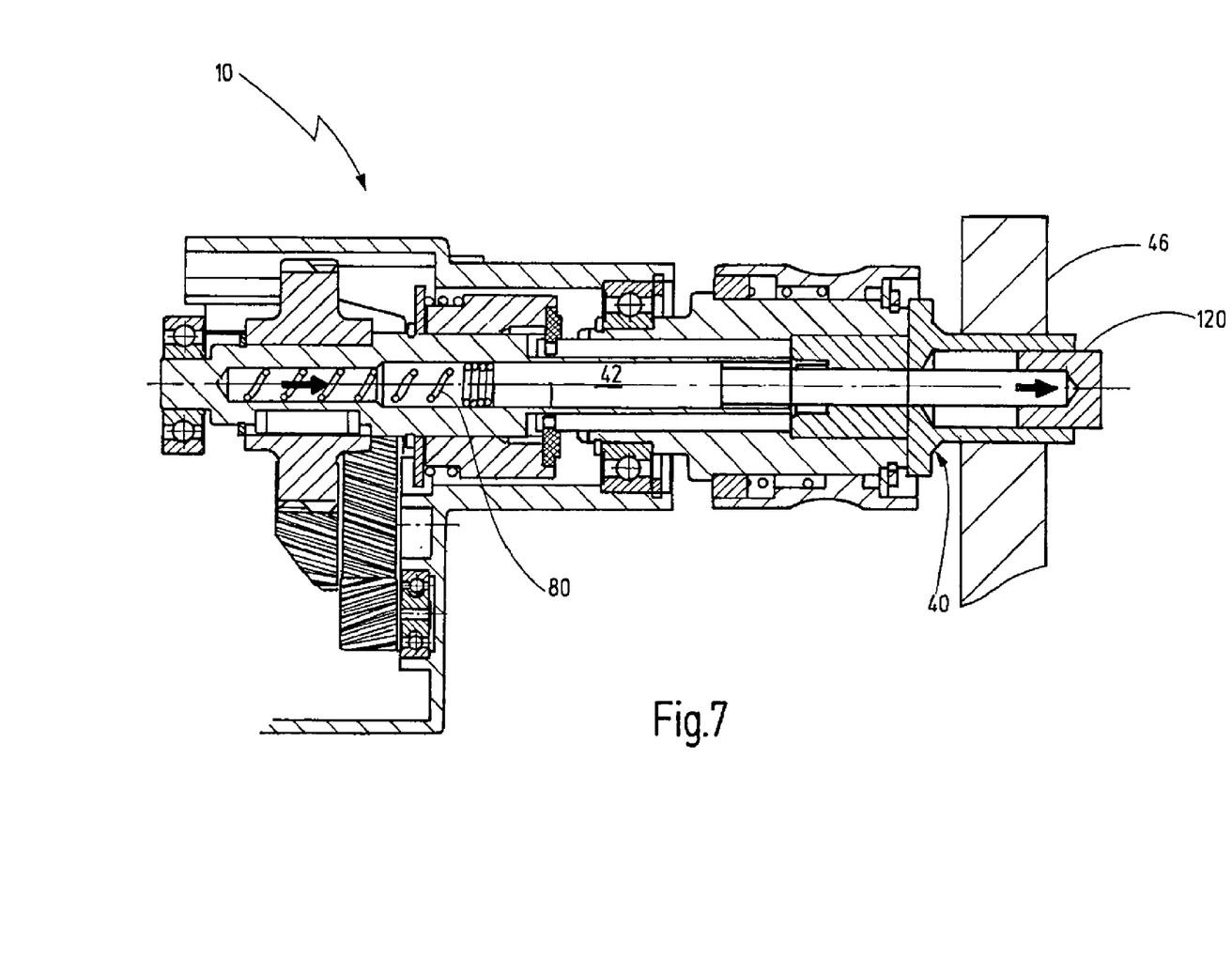
FIG. 7 shows the core drilling machine of FIG. 6, wherein a drill core is ejected by means of the returning centre drill.

In FIG. 7 the core drilling machine 10 has been moved further towards the workpiece 46 so that the drill bit 40 has completely penetrated the workpiece 46. Thus, the drill core 120 is no longer connected in a fixed manner to the workpiece 46. The energy accumulated in the spring 80 is sufficient for moving the centre drill 42 together with the drill core 120 to the front, as indicated in FIG. 7 by means of two dark arrows.

Figure 8:
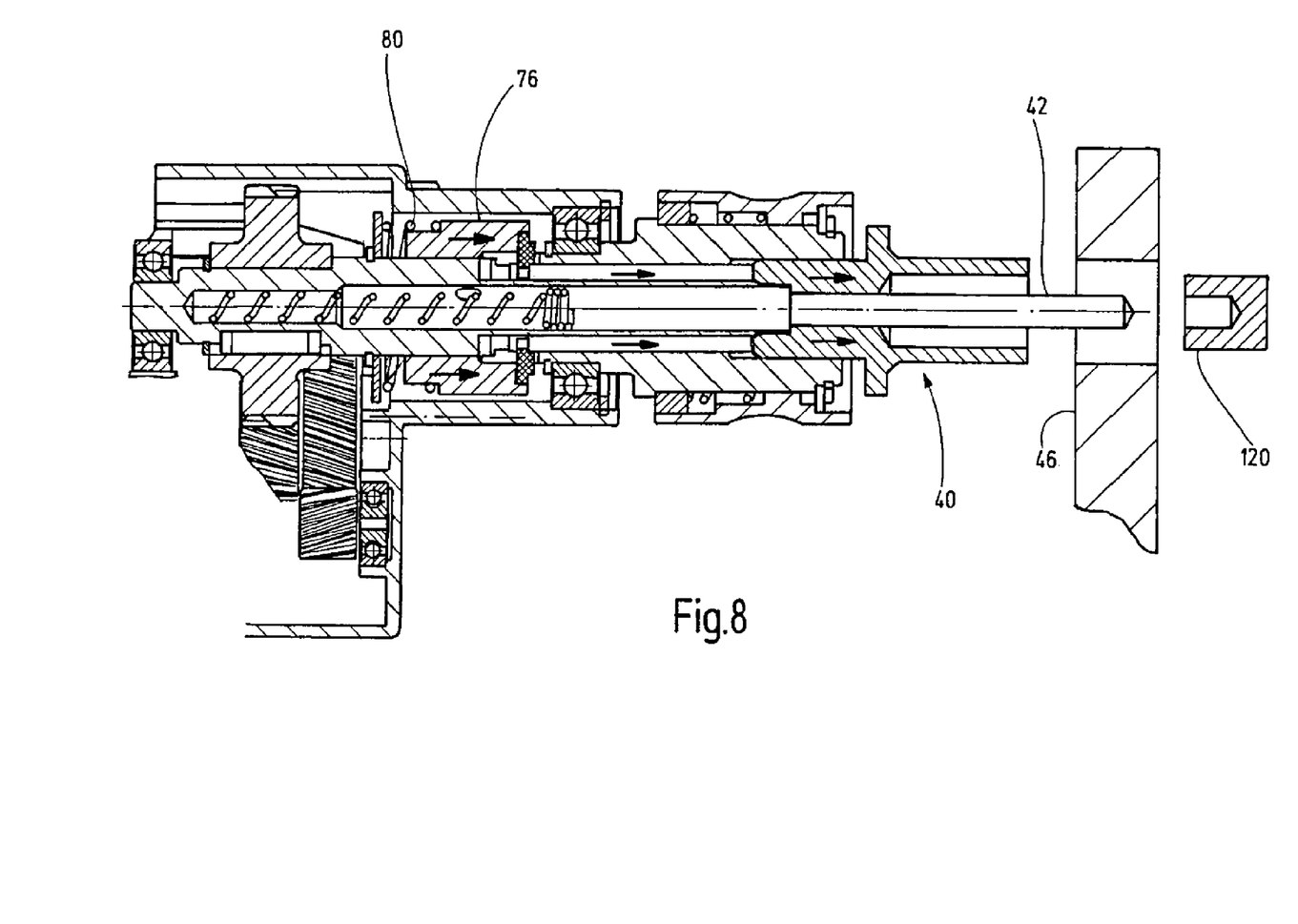
FIG. 8 shows the core drilling machine of FIG. 7 after the core drilling machine has automatically returned to a normal position.
Figures 9, 10:
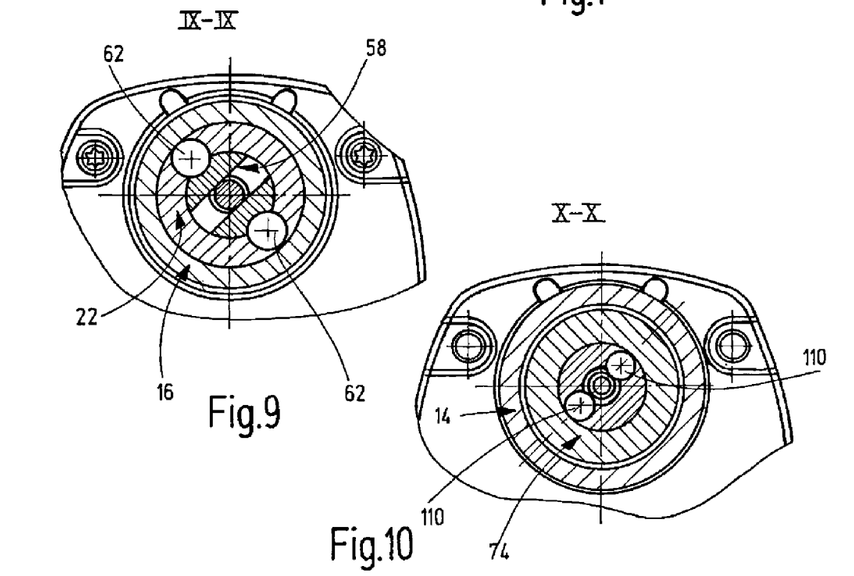
FIG. 9 shows a sectional view along line IX-IX of FIG. 1.
FIG. 10 shows a sectional view along line X-X of FIG. 1.

Subsequently, the core drilling machine 10 is retracted from the workpiece 46, as indicated in FIG. 8. As soon as the pressure on the drill bit 40 ceases, the sliding sleeve 46 is moved forwardly due to the energy accumulated in the spring 80. Thereby, the pins 70 and 72 move forward, and consequently push the drill bit 40 to the outside. Then, the core drilling machine 10 is in its the starting position again, similar as shown in FIG. 2.

It is clear that the spring elements in FIG. 2 do not need to be relaxed completely, i.e. the spring elements can also be biased. The spring elements of FIG. 2 are shown in "relaxed" states.

With reference to FIG. 9 a sectional view along a line IX-IX of FIG. 1 is shown.

In FIG. 9 the latch elements of the locking mechanism 61 are shown in more detail. In this case, the latch elements are implemented in terms of balls 62, which are provided in radial channels, not being depicted in more detail, in the front part 64 of the hollow drill shaft 22.

The balls 62 cooperate with the axial grooves 60. Length of the axial groove 60 in the receiving sleeve 58 allows the axial displacement of the drill bit 40 to the back, as can be taken from a comparison of the FIGS. 2 and 5 where the balls 62 are indicated in terms of dark circles.

It is clear that the above described invention can also be realized in terms of a cap, which is put on a conventional drilling machine by means of, for example, a sheath having three jaws. The conventional drilling machine then represents the drive. The cap includes, among other things, the hollow drill shaft, the tool holder and the activation device. In this manner, the core drilling machine of the present invention can be realized as well. The cap falls under the scope of claim 1.

Therefore, what we claim is:

1. A core drilling machine comprising:
   a housing;
   an hollow drill shaft extending substantially along an axial direction, which is supported in a rotational manner in the housing of the core drilling machine and which can be rotated by means of a drive unit;
   a coaxial tool holder for receiving a drill bit, which is supported in an axially displaceable manner, wherein the tool holder comprises a locking mechanism adapted for securing the drill bit, if the drill bit is inserted into the tool holder, in a radial direction against axially falling out, wherein the locking mechanism connects the drill bit in a rotationally fixed manner to the hollow drill shaft and allows a limited axial movement of the drill bit relative to the hollow drill shaft;
   a first spring element;
   wherein the hollow drill shaft is suitable for receiving a shaft of an interchangeable centre drill in the front of an interior, wherein the centre drill can be coupled to the hollow drill shaft in a rotationally fixed manner, wherein the centre drill can be moved axially in the hollow drill shaft in a limited manner and wherein the centre drill is axially supported against the first spring element; and a stop element which in a first position prevents the centre drill from a complete axial displacement into the interior of the hollow drill shaft, which allows in a second position a complete axial displacement of the centre drill into the interior of the hollow drill shaft; and an activation device for activating the first or second positions of the stop element as a function of an axial position of the drill bit relative to the hollow drill shaft.

2. The core drilling machine of claim 1, wherein the stop element is in the second position if the drill bit is in a position which is the axially closest relative to the hollow drill shaft.

3. The core drilling machine of claim 1, further comprising a second spring element and at least one axially extending connecting element, wherein the activation device comprises a sliding sleeve arranged coaxially relative to the hollow drill shaft, wherein the sliding sleeve is supported in an axially displaceable manner against the second spring element on the hollow drill shaft, and can be coupled to the interchangeable drill bit by means of the at least one axially extending connecting element.

4. The core drilling machine of claim 3, wherein the stop element is supported in a radially displaceable manner in an area of the hollow drill shaft where the sliding sleeve sits radially on an outside of the hollow drill shaft so that the stop element, in a relaxed state of the second spring element, is radially forced by the sliding sleeve towards the interior of the hollow drill shaft thereby protruding towards the interior, and so that the stop element, in a compressed state of the second spring element, is movable radially to the outside by means of the centre drill when the centre drill penetrates axially deeper backwards into the hollow drill shaft behind the stop element.

5. The core drilling machine of claim 4, wherein an inner cavity of the sliding sleeve has a radius which increases towards the front if an axial length of the sliding sleeve increases, thereby providing space to the stop element in a radial direction for avoiding the centre drill which can be moved in the axial direction.

6. The core drilling machine of claim 3, wherein each of the connecting elements respectively is a pin supported axially in a displaceable manner within the hollow drill shaft and being arranged axially between the sliding sleeve and the inserted drill bit, thereby coupling the drill bit and the sliding sleeve directly, or indirectly by means of additionally provided one or more disks, for the purpose of axially displacing the sliding sleeve further to the back.

7. The core drilling machine of claim 1, further comprising a third spring element, wherein the tool holder comprises a front part of the hollow drill shaft, where the locking mechanism is arranged, and a tension sleeve, which is supported in an axially displaceable manner against the third spring element, wherein the tension sleeve, in a relaxed state of the third spring element, is supported radially against the front part of the hollow drill shaft in an area of the locking mechanism.

8. The core drilling machine of claim 7, wherein the locking mechanism comprises at least one latch element, wherein each of the latch elements sits in a radial channel within the front part of the hollow drill shaft, the length of the radial channel being selected such that the latch element, in a relaxed state of the third spring element, protrudes radially through the supported tension sleeve towards the interior of the hollow drill shaft so that the latch element engages the groove of the inserted drill bit thereby preventing the drill bit from being retracted axially from the tool holder.

9. The core drilling machine of claim 1, wherein the first spring element is arranged axially between a rearward end of the interior of the hollow drill shaft and the centre drill in an inserted state thereof.

10. The core drilling machine of claim 3, further comprising a locking element, wherein the second spring element is arranged coaxially on the hollow drill shaft between the sliding sleeve and the locking element, which is supported in a rotationally fixed manner to the hollow drill shaft and which cannot be displaced axially on the outside of the hollow drill shaft.

11. The core drilling machine of claim 7, further comprising a second spring element and at least one axially extending connecting element, wherein the activation device comprises a sliding sleeve arranged coaxially relative to the hollow drill shaft, wherein the sliding sleeve is supported in an axially displaceable manner against the second spring element on the hollow drill shaft, and can be coupled to the interchangeable drill bit by means of at least one axially extending connecting element, wherein the centre drill, if all of the spring elements are relaxed, projects from the tool holder and the drill bit axially in the front.

12. A drill bit for usage with a core drilling machine comprising:

a housing;

an hollow drill shaft extending substantially along an axial direction, which is supported in a rotational manner in the housing of the core drilling machine and which can be rotated by means of a drive unit;

a coaxial tool holder for receiving a drill bit, which is supported in an axially displaceable manner, wherein the tool holder comprises a locking mechanism adapted for securing the drill bit, if the drill bit is inserted into the tool holder, in a radial direction against axially falling out, wherein the locking mechanism connects the drill bit in a rotationally fixed manner to the hollow drill shaft and allows a limited axial movement of the drill bit relative to the hollow drill shaft;

a first spring element;

wherein the hollow drill shaft is suitable for receiving a shaft of an interchangeable centre drill in the front of an interior, wherein the centre drill can be coupled to the hollow drill shaft in a rotationally fixed manner, wherein the centre drill can be moved axially in the hollow drill shaft in a limited manner and wherein the centre drill is axially supported against the first spring element;

a stop element which in a first position prevents the centre drill from a complete axial displacement into the interior of the hollow drill shaft, which allows in a second position a complete axial displacement of the centre drill into the interior of the hollow drill shaft;

an activation device for activating the first or second positions of the stop element as a function of an axial position of the drill bit relative to the hollow drill shaft, wherein the activation device comprises a sliding sleeve, which is arranged coaxially relative to the hollow drill shaft, and at least one axially extending connecting element;

a second spring element, wherein the sliding sleeve is supported in an axially displaceable manner against the second spring element on the hollow drill shaft, and can be coupled to the interchangeable drill bit by means of the at least one axially extending connecting element;

wherein the stop element is supported in a radially displaceable manner in an area of the hollow drill shaft where the sliding sleeve sits radially on an outside of the hollow drill shaft so that the stop element, in a relaxed state of the second spring element, is radially forced by the sliding sleeve towards the interior of the hollow drill shaft, thereby protruding towards the interior, and so that the stop element, in a compressed state of the second spring element, is movable radially to the outside by means of the centre drill when the centre drill penetrates axially deeper backwards into the hollow drill shaft behind the stop element;

wherein the drill bit comprises at least one groove into which the locking mechanism engages in the inserted state of the drill bit so that the drill bit rotates synchronously, if the hollow drill shaft is rotated, and so that the drill bit is simultaneously supported in an axially displaceable manner relative to the tool holder.

13. The drill bit of claim 12, wherein an axial length of the groove is selected sufficiently long so that the drill bit pushes the sliding sleeve during a drilling process axially backwards by means of the at least one connecting element so that the second spring element is compressed such that the sliding sleeve provides to the stop element space in a radial direction for avoiding the retreating centre drill.

14. The drill bit of 12, wherein the drill bit comprises a receiving sleeve, an apron (56) and a cutting cup, wherein the groove is formed in the receiving sleeve, wherein the apron protrudes the receiving sleeve radially, in order to form a security stop, and wherein a length of the receiving sleeve is selected such that the apron abuts against a front edge of the tool holder before the hollow drill shaft is damaged due to an over-compression of the second spring element.

15. A centre drill comprising a shaft having an axial length for usage with a core drilling machine and a drill bit, wherein the core drill machine comprises:

a housing;

an hollow drill shaft extending substantially along an axial direction, which is supported in a rotational manner in the housing of the core drilling machine and which can be rotated by means of a drive unit;

a coaxial tool holder for receiving a drill bit, which is supported in an axially displaceable manner, wherein the tool holder comprises a locking mechanism adapted for securing the drill bit, if the drill bit is inserted into the tool holder, in a radial direction against axially falling out, wherein the locking mechanism connects the drill bit in a rotationally fixed manner to the hollow drill shaft and allows a limited axial movement of the drill bit relative to the hollow drill shaft;

a first spring element;

wherein the hollow drill shaft is suitable for receiving a shaft of an interchangeable centre drill in the front of an interior, wherein the centre drill can be coupled to the hollow drill shaft in a rotationally fixed manner, wherein the centre drill can be moved axially in the hollow drill shaft in a limited manner and wherein the centre drill is axially supported against the first spring element;

a stop element which in a first position prevents the centre drill from a complete axial displacement into the interior of the hollow drill shaft, which allows in a second position a complete axial displacement of the centre drill into the interior of the hollow drill shaft;

an activation device for activating the first or second positions of the stop element as a function of an axial position of the drill bit relative to the hollow drill shaft, wherein the activation device comprises a sliding sleeve, which is arranged coaxially relative to the hollow drill shaft, and at least one axially extending connecting element;

a second spring element, wherein the sliding sleeve is supported in an axially displaceable manner against the second spring element on the hollow drill shaft, and can be coupled to the interchangeable drill bit by means of the at least one axially extending connecting element;

wherein the stop element is supported in a radially displaceable manner in an area of the hollow drill shaft where the sliding sleeve sits radially on an outside of the hollow drill shaft so that the stop element, in a relaxed state of the second spring element, is radially forced by the sliding sleeve towards the interior of the hollow drill shaft, thereby protruding towards the interior, and so that the stop element, in a compressed state of the second spring element, is movable radially to the outside by means of the centre drill when the centre drill penetrates axially deeper backwards into the hollow drill shaft behind the stop element;

and wherein the drill bit comprises:

at least one groove into which the locking mechanism engages in the inserted state of the drill bit so that the drill bit rotates synchronously, if the hollow drill shaft is rotated, and so that the drill bit is simultaneously supported in an axially displaceable manner relative to the tool holder.

* * * * *